March 11, 1924.  M. NEWCOMER  1,486,194
MANUFACTURE OF CARTRIDGE SHELLS
Filed Feb. 21, 1922
Fig. 1.
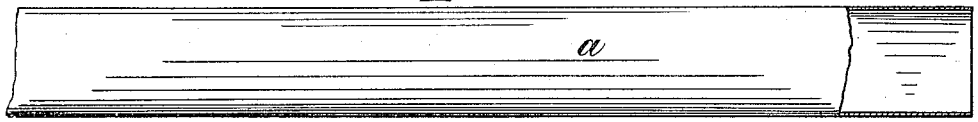
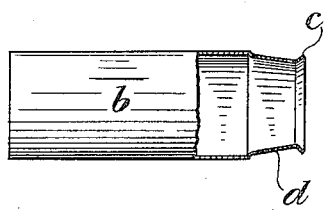 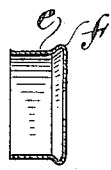 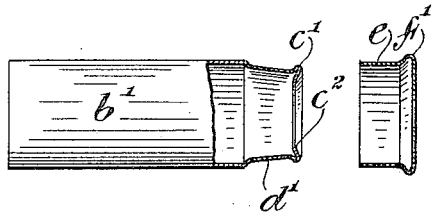
Fig. 2.  Fig. 3.
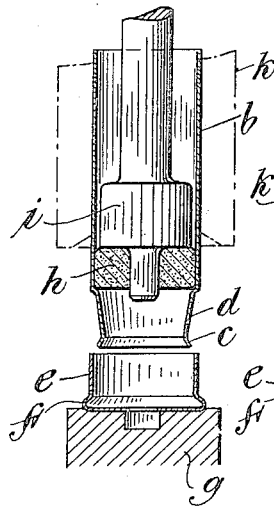 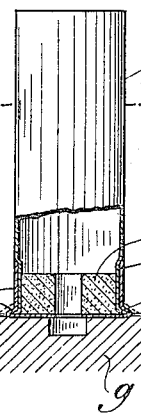 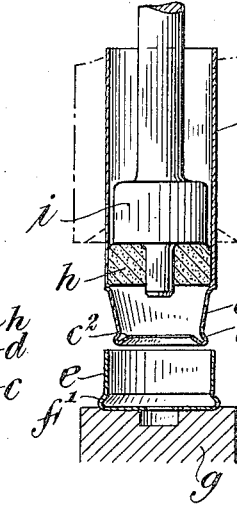 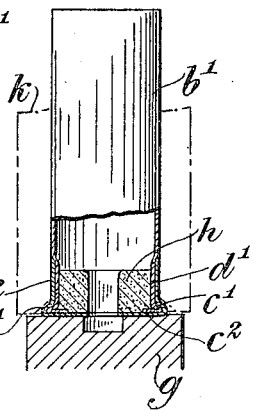
Fig. 4.  Fig. 5.  Fig. 6.  Fig. 7.
INVENTOR
Martin Newcomer
BY
Redding & Greeley
ATTORNEYS Patented Mar. 11, 1924.

1,486,194

UNITED STATES PATENT OFFICE.

MARTIN NEWCOMER, OF PERTH AMBOY, NEW JERSEY.

MANUFACTURE OF CARTRIDGE SHELLS.

Application filed February 21, 1922. Serial No. 538,239.

*To all whom it may concern:*

Be it known that I, MARTIN NEWCOMER, a citizen of the United States, residing in Perth Amboy, in the State of New Jersey, have invented certain new and useful Improvements in Manufacture of Cartridge Shells, of which the following is a specification, reference being had to the accompanying drawing, forming a part hereof.

The object of this invention is to make economically possible the production of cartridge shells which shall be thoroughly satisfactory to the user. The invention has been developed with particular reference to the production of shot-gun shells but is not limited in its application to the production of such shells. The disadvantages of paper-body shells, both in respect of manufacture and in respect of use, are well recognized and efforts have been made heretofore to produce metallic or non-paper shells for shot-gun and other uses, but either because of weaknesses of construction or of high cost of manufacture of such metallic or non-paper shells, paper-body shells have continued to hold the market. In accordance with the present invention it becomes possible to use for the bodies of the shells seamless tubing, thereby avoiding the weakness and danger of splitting and the relatively high cost of manufacture due to the use of seamed bodies, and at the same time providing for the union of such seamless bodies with the usual heads or cups so as to secure the body and the cup or head together inseparably and in such a manner as to involve a minimum of expense. The invention will be more fully explained hereinafter with reference to the accompanying drawing in which it is illustrated and in which—

Figure 1 is a view in side elevation, partly broken away, of a length of tubing from which the cartridge shell bodies can be cut of suitable length.

Figure 2 is a view showing in separated relation a shell body and a cup or head before assemblage, a portion of the shell body and the cup or head being shown in section.

Figure 3 is a similar view showing a slightly modified form of the shell body.

Figure 4 is a view in longitudinal section illustrating a further step in the process of manufacture of the improved shell of the form shown in Figure 2.

Figure 5 is a view partly in elevation and partly in longitudinal section showing the completed shell shown in the process of construction in Figure 4.

Figures 6 and 7 are views respectively similar to Figures 4 and 5 but illustrating the formation of the modified form of shell indicated in Figure 3.

In practicing the invention, seamless tubing $a$, which is preferably of metal although other material which is capable of being worked like metal might be used, is cut into suitable length, as indicated at $b$ and $b'$. At the time when the proper length of tubing is cut off or subsequently thereto, one end of the tubing is flanged outwardly as at $c$ and the tubing is also reduced in diameter, as at $d$, so that the extreme diameter of the flanged portion $c$ shall be no greater than the maximum diameter of the body $b$. For each body $b$ there is also prepared in usual manner a cup or head $e$ which as usual is formed with a rim $f$, such rim, when the cup or head is formed, being open, as shown in Figures 2, 3 and 4. The purpose in reducing the end portion of the body $b$, as shown at $d$ in Figures 2 and 4 is to enable the outwardly turned flange $c$ to be introduced with in the head or cup $e$, while the main portion of the body $b$ has substantially the same external diameter as the cup or head $e$. When the two parts of the shell, the body $b$ and the cup or head $e$, have been formed as described the cup or head $e$ is placed in proper relation with an anvil or heading punch, as indicated at $g$ a perforated wad $h$ is placed within the body $b$, the end portion of the body is inserted within the cup or head, the wad $h$ is supported by an inner punch or holding punch $i$ and an annular die $k$ is fitted closely about the cup or head $e$. When the heading punch or anvil and the inner or holding punch receive the required relative movement the flange $c$ is driven by the wad $h$ into engagement with the rim $f$ of the cup or head $e$ and at the same time the rim is closed upon the flange. The wad $h$, as is well understood in the art, is compressed in the direction of the axis of the shell and is expanded against the interior of the shell by the action of the plunger to press the shell into close contact with the cup or head and at the same time fill completely the interstice at the rim. The seamless body is thus secured to the cup or head inseparably and in an inexpensive manner.

In some cases it may be considered desirable to form a double flange at the extremity of the reduced portion $d'$ of the body $b$, as illustrated in Figures 3 and 6, the extremity of the body being first turned outwardly, as at $c'$, and then turned inwardly as at $c^2$. The cup or head $e$ is formed as before, but with the rim $f'$ somewhat more open. The procedure in uniting the body and the cup or head is the same as that already described with reference to Figures 2, 4 and 5, the reduced portion $d'$ of the body being introduced within the cup or head and the wad $h$ being driven home by the cooperation of the inner punch $i$ and the heading punch or anvil $g$ while the die $k$ surrounds and acts upon the cup or head.

It will be observed that in the formation of the improved shell only three operations are required, one for cutting off, reducing and flanging the body portion, one for forming the cup or head in the usual manner, and one for assembling and uniting the body and the cup or head. It will also be observed that the body and the cup or head are united inseparably.

I claim as my invention:

The improvement in the manufacture of cartridge shells which consists in forming a rimmed cup or head, forming a shell body with a reduced end portion and an outwardly turned flange at its extremity, introducing the reduced portion of the body within the cup or head, and forcing the reduced portion of the body outwardly against the cup or head and the flange of the body into the rim of the cup or head.

This specification signed this 14th day of February A. D. 1922.

MARTIN NEWCOMER.